United States Patent [19]

Taylor et al.

[11] Patent Number: 5,790,642
[45] Date of Patent: Aug. 4, 1998

[54] COMPETITIVELY BIDDING SERVICE CENTERS

[75] Inventors: John Taylor, Redwood City; Laurence Fromm, Saratoga, both of Calif.

[73] Assignee: Dialogic Corporation

[21] Appl. No.: 547,641

[22] Filed: Oct. 24, 1995

Related U.S. Application Data

[63] Continuation-in-part of Ser. No. 430,564, Apr. 28, 1995, abandoned.

[51] Int. Cl.⁶ .................................................. H04M 15/00
[52] U.S. Cl. ............................ 379/112; 379/114; 379/115
[58] Field of Search ................................. 379/111, 112, 379/113, 114, 115, 96, 100, 207, 220, 221, 100.01, 100.04, 93.17, 93.05, 93.06, 93.08

[56] References Cited

U.S. PATENT DOCUMENTS

| | | | |
|---|---|---|---|
| 4,791,665 | 12/1988 | Bogart | 379/207 |
| 4,969,184 | 11/1990 | Gordon | 379/96 |
| 5,163,042 | 11/1992 | Ochiai | 379/220 |
| 5,425,084 | 6/1995 | Brinskele | 379/114 |

*Primary Examiner*—Vijay Shankar
*Attorney, Agent, or Firm*—Jeffrey Kaplan

[57] ABSTRACT

A plurality of service centers, disbursed throughout a telecommunications network such as the public switched telephone system (PSTN), competitively bid for the rights to service a particular call to be serviced from one of the service centers. After comparing the cost (or other parameter to be optimized) of servicing a call from the numerous different service centers, the cost (or other parameter) of the call is minimized (optimized) by assigning it to the service center which can service the call at the lowest possible cost (best value of any other parameter).

16 Claims, 5 Drawing Sheets

COMPETITIVELY BIDDING SERVICE CENTERS

RELATED APPLICATION

This application is a continuation-in-part of U.S. patent application Ser. No. 08/430,564 filed Apr. 28, 1995, now abandoned.

TECHNICAL FIELD

This invention relates to telecommunications, and more specifically, to an efficient method of routing information from numerous telecommunications service centers to one or more end users.

DESCRIPTION OF THE PRIOR ART

During the past ten years, there has been a significant coupling between various types of computers and telecommunications networks. Information is now routinely exchanged throughout the world and between computers over telecommunications networks such as the public switched telephone network, packet switched networks, etc. One specific type of information which is being exchanged at an ever increasing rate is facsimile information.

Facsimile information is comprised of image data which is decomposed into a series of pixels which represents an image. The image may be compressed and is then sometimes represented as a series of tones. The tones are transmitted over the telephone line, to a receiving facsimile machine, which converts the tones into the original image. The number of tones required to transmit the image may be decreased by utilizing any of a variety of encoding techniques such as, for example, Modified Read, Modified Hoffman, or Modified Modified Read.

In recent years, two techniques of exchanging facsimile information which have become popular are (i) faxback and (ii) fax broadcast. Faxback, as it is termed in the telecommunications industry, is an arrangement for allowing end users to obtain facsimile type information from a fax service center. Specifically, the user telephones the fax service center and enters in, typically using DTMF tones, a code corresponding to the information desired. The information is then automatically faxed to the end user. The information may be faxed back to the end user during the same telephone call, resulting in the user initiating the call being charged for the telephone time required to send the fax. Alternatively, the user may enter a facsimile number, during the call and using DTMF tones, and the information is faxed to the entered number after the user hangs up. In either case, the technology allows any user to call in and receive printed information automatically, anytime of day, and without other human intervention.

Fax broadcast is a technology whereby large numbers of entities require the same information by facsimile. For example, consider the mortgage lending industry, whereby the current rates of a particular bank are required to be transmitted by facsimile to hundreds if not thousands of mortgage brokers and banking agents nationwide. The list of facsimile numbers is programmed into a computer and the computer dials all of the telephone numbers and transmits the facsimile information to the users.

It can be appreciated from the above that the telecommunications costs associated with carrying out the above two types of facsimile technologies can be quite excessive. For example, when one considers the cost of faxing, from a New York fax service center, ten thousand faxes to users all over the world, one can easily appreciate that the cost of telecommunications quickly becomes exorbitant. Accordingly, any slight savings for each facsimile call can certainly add up to a relatively large sum of money over the course of months and years.

Recently, effort has been made by these service center operators to minimize transmission costs. One example of such an effort is described in U.S. Pat. No. 5,196,943 to Hersee which teaches the one call fax back described above. The telecommunications charges are paid by the caller, rather than by the service center as explained above. One drawback of the Hersee arrangement is that the end user cannot call from a telephone which has no fax receiving capabilities.

Another attempt at minimizing telecommunications charges is embodied in several prior art fax broadcast systems. Specifically, in performing fax broadcasting, many systems first determine from the telephone number to which the information is to be sent, a city and/or country in which the end user is located. The system then bundles several calls for that city/country together and transmits them over a fixed cost line to a different service center located closer to that city (i.e.; a local service center). Accordingly, a per call toll charges between remote cities are not encountered because a fixed cost line is used for the transmission between remote cities rather than the public switched telephone system (PSTN). The local service center then transmits the information to the user via the PSTN.

While some systems do in fact achieve some cost savings, there is further room for improvement. For example a service center to which the information is sent over the dedicated line may be overloaded or non-functioning and the calls will experience a service delay or may never be serviced. Moreover, due to telecommunications billing practices, including time of day rate changes, connection charges, etc., there are numerous calls which may be cheaper to service from a remote location in a different city than from a place closer to the end user of the information.

For example, consider a service center operating in San Francisco, Calif. Presume that there is a fixed cost line between such a center and a second service center located in Pennsylvania. A plurality of calls from the California service center, but destined for New York, may be sent over the fixed cost line to Pennsylvania. From Pennsylvania, the calls could be sent, via the PSTN, to the end users in New York.

It is noted however, that the time in California is three hours earlier than in New York and Pennsylvania. Thus, it may be cheaper to send the information directly from California to New York, at 7 AM California time, than to send information from Pennsylvania to New York at 10 AM Eastern Time when rates may be higher.

Additionally, each service center must maintain and update routing tables based upon the destination of each facsimile message. This increases processing overhead, storage requirements, and the overall cost of the system.

Another factor that influences charges incurred for a telephone call are connection costs. A first location may incur a relatively high initial connection cost and a relatively low per-minute cost, while a second location may incur high per-minute costs but little or no connection charges. In such a situation, the duration of the call will be a factor in determining which location will incur a higher cost in servicing the call.

In view of the above, it can be appreciated that there exists a need in the art for a real time and dynamically adapting system which minimizes transmission costs for each and every facsimile transmission. Additionally, there are non-facsimile applications which may also advantageously utilize the present invention.

SUMMARY OF THE INVENTION

The above and other problems of the prior art are solved and a technical advance is achieved in accordance with the present invention which relates to a dynamic system for insuring that telecommunications costs are minimized for fax and other types of service centers. In accordance with the inventive technique, a determination is made, from among the plurality of service centers, which center can transmit (e.g.; service) the call in the most cost efficient manner. Parameters such as time of day at each service center, duration of call, telephone number to which the information must be transmitted, and other cost factors are taken into account and analyzed by the service centers. Each service center "bids" to obtain the "job" of transmitting the information. The service center with the lowest cost performs the required transmission. Accordingly, the method guarantees that each call is serviced in the most cost efficient manner possible.

In an enhanced embodiment, the technique permits information regarding whether or not the service centers are operable to be taken into account because a service center does not bid on a job if it is not operable. Accordingly, the job cannot be assigned to a service which does not bid, and therefore, if a service center is not operable it is not awarded the job.

Additionally, if the service center is extremely busy and would have to stop doing other tasks in order to perform the required facsimile transmission function, this can also be taken into account through a bid factor. Specifically, the software at each service center may be arranged such that the bid increases by a particular factor if the service center is particularly busy. In this manner, the likelihood of that service center receiving the job of transmission is lessened when that service center is busy yet that service center is still available if absolutely needed for the transmission of the job.

Several other embodiments are disclosed which are useful for optimizing performance and minimizing cost. Bidding may be done on a "per call" basis, or service centers may bid on blocks of calls destined for a particular area code, location, etc. The bidding software may reside in a centralized location, or may reside at each service center. The service centers may be independently and privately owned, or may be part of the public network. The bidding overhead may be lowered if the se Ice center has "knowledge" that only a small number of service centers need bid for the job, because all other service centers would incur a relatively high cost to process the job. Other embodiments are described hereafter.

Additionally, while the invention is described mainly with respect minimizing costs of fax transmission, the inventive technique is not limited to fax transmission, but rather is applicable to optimization of any criteria or parameter among a plurality of interconnected service centers for performing any tasks. For example, power stations could competitively bid for the opportunity supply power to a particular location.

DETAILED DESCRIPTION OF THE PREFERRED EMBODIMENT

Figure 1:
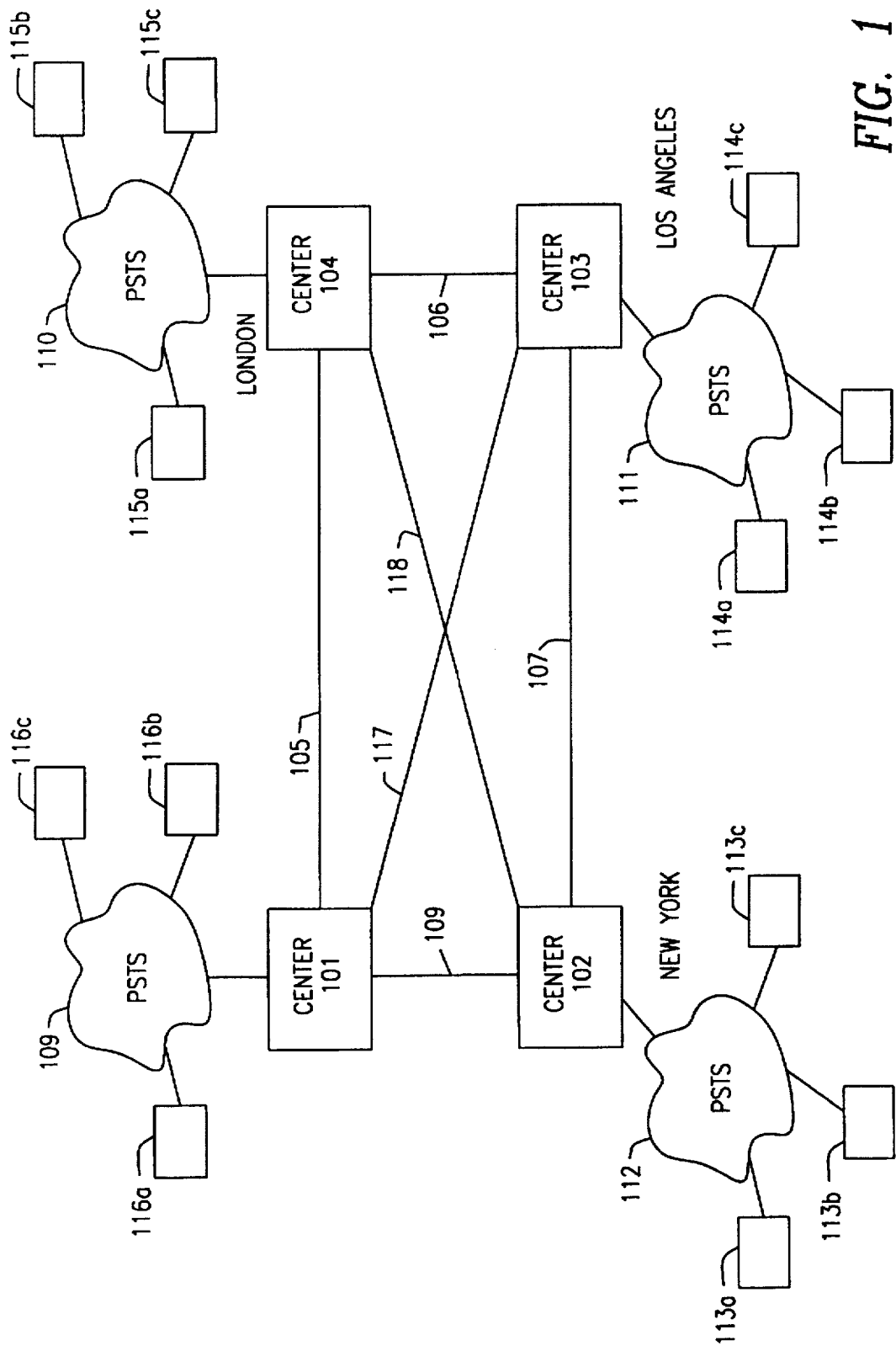
FIG. 1 is a high-level system depiction of portions of a worldwide automated facsimile system comprising a plurality of service centers.

FIG. 1 depicts an exemplary network of telecommunications centers 101–104, located in Tokyo, New York, Los Angeles and London, respectively as indicated in the figure. The centers are interconnected via dedicated, fixed cost telecommunication lines 105 through 108 and 117–118. It should be noted that although the dedicated lines 105–108 and 117–118 are shown as point to point single connections between the telecommunication centers, this is shown only for conceptual purposes and is not meant to indicate the physical structure of such connections. Specifically, these connections may actually be implemented over the public switched telephone system (PSTN), which may include satellite networks, fiber optic lines, radio links or other media.

Additionally, some of these lines may not be necessary if the service center itself acts as a switch. For example, line 118 may be eliminated by transmitting data between centers 102 and 104 over fixed cost lines 107 and 106. The important point however, in this embodiment, is that communications between the service centers is accomplished over fixed cost lines rather than lines which incur toll charges. Thus, while the fixed cost lines may be implemented as part of the public network, they are paid for as a fixed periodic fee.

Alternatively, rather than using fixed cost lines, a packet switched or other network may be used. Indeed, the bid calculated by the service center may include costs of routing the fax to its destination through some combination of point-to-point lines, packet switching, and public telephone systems, as well as any other communications media.

Also shown in FIG. 1 are PSTN 109–112 respectively, each associated with one of the telecommunications centers 101–104. The PSTN 109–112 is actually one large PSTN, but portions 109–112 are shown separately for purposes of explanation. A plurality of facsimile machines 113–116 are shown as connected to each PSTN. It should be noted that the fax machines 113–116 may actually be virtual fax machines, (e.g.; a computer which is acting as a fax machine).

We consider first the case of fax broadcast, whereby a message stored at telecommunications center 102, for example, needs to be broadcast to numerous fax machines coupled to PSTN 109–112. The recipient's fax machine may be located on any portion of the PSTN. The initiation of the broadcast process may occur at any of the service centers 101–104, as part of any of a variety of software packages which are either available in the automated facsimile industry or which can be developed in a straightforward manner by those of ordinary skill in this art.

The center 102 may construct a record or other database structure which indicates cost factors impacting the price of servicing the call. These factors may include, (i) telephone number to which the information should be faxed; (ii) length of information to be faxed; (iii) time restrictions concerning when the information must be faxed; and (iv) any other cost factors or required information deemed relevant by the system user. This information is termed herein a bid request record, or simply, a bid request, and is transmitted to center 101 over telecommunications line 108, to Los Angeles center 103 via telecommunications line 107, and to London center 104 via telecommunications line 118.

Each of the telecommunications centers 101–104 includes a costing algorithm, which parses the information in the bid request and determines therefrom the cost for that particular center to complete the call. In furtherance of this same purpose, each of the service centers 101–104 also includes telephone cost tables for making local and long distance calls through the associated portion of the PSTN.

Once the cost of the call is determined at each particular service center, the calculated cost information is transmitted back to the originating service center 102. The information may be transmitted back in the form of any convenient data structure, but ideally only occupies a few bytes and results in extremely minimal overhead.

After receiving all of the bids, the originating service center 102 compares the bids and selects the lowest bidding service center to make the call. An instruction, or "contract", to make the call is sent to the lowest bidder. The information required, including any facsimile data to be transmitted, is then sent to the lowest cost center via the appropriate ones of dedicated lines 105–108 and 117–118 and the call is then completed via the PSTN portion associated with the lowest cost service center. Optionally, an acknowledgement may be sent from the lowest bidding service center to the originating center indicating that the call has been serviced.

It can be appreciated that the above described scenario and the arrangement depicted in FIG. 1 provides for each call to be analyzed by the various service centers in order to determine the lowest cost of the particular call. There are however, several variations for altering and perhaps optimizing the operability and reliability of the arrangement shown in FIG. 1. One such enhancement includes the idea of cost factoring based upon the load presently operating at a particular one of centers 101–104. Specifically, during certain times of day, the London center 104 may be extremely busy performing other tasks. Although a particular call may be cheapest to complete from London center 104, center 104 may be so overloaded that other tasks being performed will suffer or have to be delayed if the London center services the call.

In order to minimize the risk of such an occurrence during particular times of heavy system loading at, for example, service center 104, all bids for calls by center 104 will be increased by a system loading factor. This can be accomplished by applying the desired cost factor at particular times, or when system loading increases beyond eighty percent, for example, or even at any time that certain high priority tasks are being performed.

Thus, if a particular call costs a dollar, it may be decided that the London center 104 will bid $1.50 to make the call. In this manner, the London center 104 will not be utilized every time it is the least expensive place from which the call should be initiated but rather, the London center will only be utilized if all other centers will incur charges of at least 50% more to make the call than the cost of making the call from the London center.

Alternatively, the bidding center can determine how much profit is being generated from a task presently being performed and can increase its bid enough so that service of the call will generate more profit. Thus, if the job is awarded to that bidding center, the bidding center will stop what it is presently doing to service the job, since such a scenario generates more profit than the task presently being performed. If the increased bid means that a different service center gets the job, due to its lower bid, then the particular service center in question continues to perform whatever task it is presently performing. Such a scenario is efficient economically, as the activity which generates the greatest profit is performed by the service center.

In other words, if the call is only slightly cheaper to make from the London center than from the Tokyo center, the Tokyo center will make the call if the London center is very busy. On the other hand, if the London center 104 can complete the telephone call at a significantly less expensive rate than the Tokyo center, then the London center 104 will complete that call notwithstanding the fact that it may delay other tasks being performed at London center 104.

Another advantage of the technique is that it takes into account the different compression algorithms used. Specifically, a service center using a more sophisticated compression algorithm may be able to service the call for less cost than a second service center, even though the per time unit toll charges from the second service center are cheaper, because the length of the call from the second service center will be much longer, due to the fact that the advanced compression algorithm is unavailable at the second service center. This enhancement is partially dependant upon the receiving fax machine's ability to support the highest bit rate available from the service center awarded the job. This issue will be discussed in more detail later herein.

In a different embodiment, the exchange of messages over dedicated lines 105–108 and 117–118 is eliminated or minimized by including cost tables for the various PSTN 109–112 at each center 101 to 104. In this manner, once the bid request is assembled, the service center can determine the cost of completing the call from any of the centers 101 to 104 without communicating with those other centers. The center can then assign the call to either itself or one of the other centers via dedicated lines 105–108 and 117–118. Slight drawbacks of this embodiment include (i) lack of real time data about the operability of the other service centers when making a decision concerning which service center should be assigned the call and (ii) large amounts of storage required at each center 101 to 104 in order to store cost tables associated with numerous different centers around the world which may number much greater than the four exemplary centers shown in FIG. 1.

Figure 3:
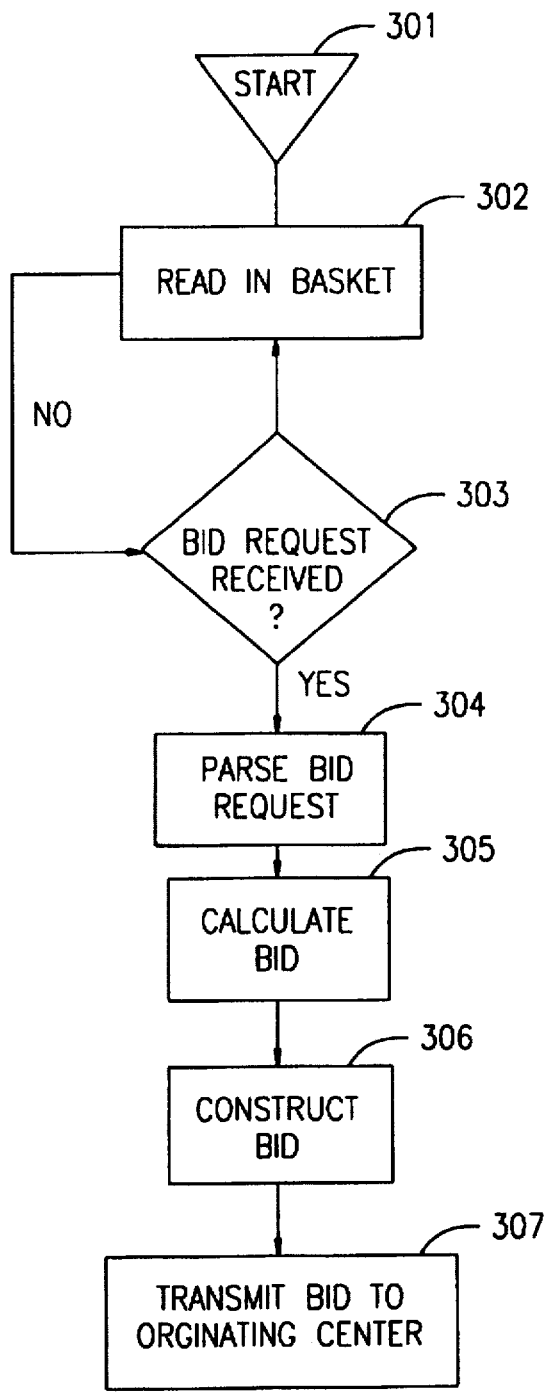
FIG. 3 depicts a flow chart of software which can be used to implement the present invention at one of the plurality of service centers which bid on the job.

Referring to FIG. 3, shown therein is a flow chart which can be utilized to implement the bidding portion of the present invention at each service center 101–104. The flow chart of FIG. 3 may be implemented in a straightforward manner using the variety of software languages widely available today. Additionally, it is noted that the flow chart of FIG. 3 is intended to represent only the bidding software, in conceptual form, which could be present at each service center. The remaining software at the service centers is utilized to perform conventional functions in the typical fashion known to those of ordinary skill in this art.

Figure 2:
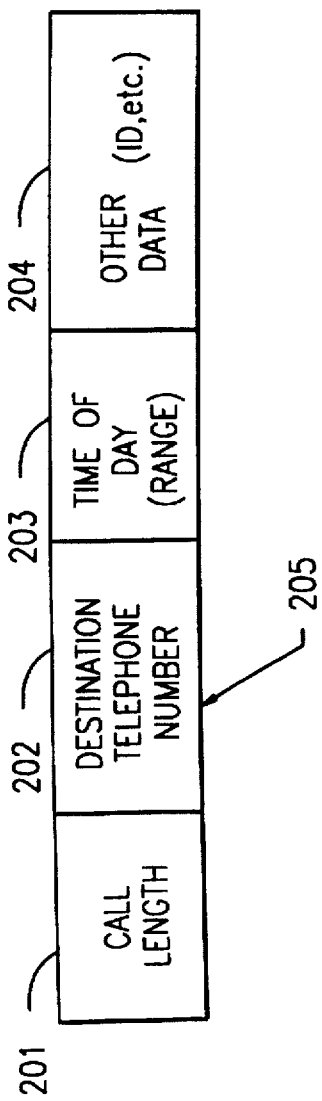
FIG. 2 shows a data structure suitable for use among service centers for allowing the service centers to "bid" on particular jobs.

The program is entered at start 301 and a bid request is read from the in-basket (i.e.; received) at block 302. The loop comprised of block 302 and decision point 303 continues to search for incoming bid requests until one is located. The structure of the bid request is quite simplistic, and an exemplary such bid request 205 is depicted in FIG. 2 as 205. The bid request includes data such as the call length 201, destination telephone number 202, time of day 203 and other necessary data which increases the sophistication of the system.

Concerning call length 201, it is noted that the call length may be expressed in time, bytes of data, or other convenient representation thereof. Concerning the destination telephone number, this number will be used in order to determine, from cost tables, the cost of completing the call and transmitting the required information. Concerning time of day portion 203, it is noted that the time may be expressed in terms of a range during which the call must be transmitted, a time of day by which the call must be transmitted, or after which the call must be transmitted, or other such time of transfer restrictions. The time of transfer restriction could even be several time ranges, with the "bidding" center being responsible for choosing the least expensive time of day from the available choices provided by the original service center. The particular protocol utilized to specify any of the information contained in the bid request is not critical to the present invention, and those of ordinary skill in this art will appreciate that there are numerous ways of achieving the desired result. Finally, other data 204 may include, for example a call ID, the originating service center's address, or any other information desired by the system designer.

Preferably, the bid request is only a few bytes of data because each piece of information required to properly assess the cost of the call can be represented as only a few bits. Thus, all information required to fully calculate the cost of the call can be represented as only a few bytes. Accordingly, the bidding process does not result in significant added overhead.

Returning to FIG. 3, control is then transferred to parse bid request 304 in which the necessary data for costing the telephone call is extracted from the appropriate fields of bid request 205. Next, calculate bid block 305 determines the cost to process the job. This calculation may include various factors such as the particular compression algorithm utilized by the service center in order to compress facsimile images, the length of the facsimile information to be transmitted, the baud rate, telephone charges, loading factors, or any other information. In summary, the output from block 305 is the cost for the particular bidding center to process the job.

Control is then transferred to block 306 which constructs a bid record by placing the bid in a predetermined format. Next, at block 307, the bid is transmitted over the appropriate one or more of fixed cost lines 105–107 and 117–118, to the originating service center.

After such transmission, the bidding center can continue with its other tasks. If the bidding center is awarded the job, the originating center will send a message with any required data which is needed by the bidding center to perform the task (e.g.; the fax image to be transmitted). Thus, the bidding process ends with the transmission of a bid at block 307.

Figure 4A:
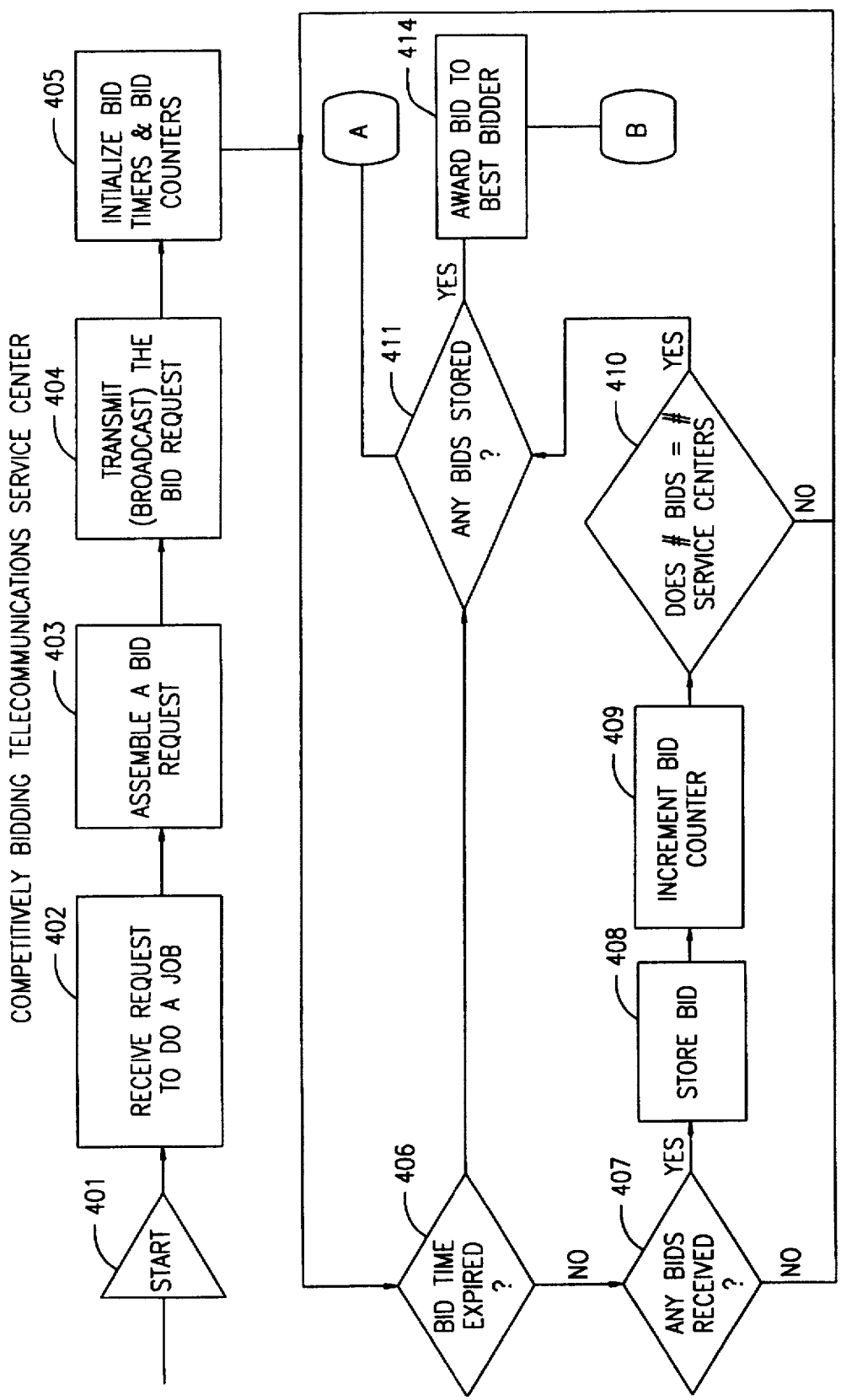
FIG. 4A is a portion of a flow chart to be used by a service center requesting bids from other service centers.

FIGS. 4A and B depict a flow chart for use at the originating service center, i.e., the service center which generates and broadcasts the bid request. Beginning with start point 401, the originating service center receives a request at block 402, which request may arrive via the public switched telephone network or any other communication path. The request may include, for example, a request to transmit facsimile information to a specified telephone number.

Assemble bid request block 403 places the required information into a predetermined format. The required information for a bid request is indicated conceptually at FIG. 2, but may include other information as well. In general however, assemble bid request block 403 will generate a data structure which includes all of the information required by the bidding service center, previously described in order to generate their respective bids. Once the bid request is assembled, it is transmitted to the bidding service center at block 404.

After the bid request is transmitted, the originating service center then awaits arrival of the bids from the respective bidding service centers. First, the bid timer and bid counter (explained more fully later herein) are both initialized at block 405. The bid timer and bid counter are intended to inform the originating service center if and when it has all of the information from the other bidding centers which it needs to award the job to the lowest cost service center. Specifically, and by way of example, the originating service center should award the job to the lowest bidding service center when any of the following occurs (i) it has received the bids from all of the service centers; (ii) the maximum time to receive such bids has expired, even if all bids have not yet been received or (iii) any bid is received which is below a predetermined threshold which is deemed low enough to be acceptable.

Turning to decision point 406, the bid time is calculated to be the roundtrip time for the bid request to be transmitted from the originating center to all of the bidding centers, and for the bidding centers to return their bids to the originating center. This time can be calculated by those of ordinary skill in the art by simply taking into account the worst case scenario for roundtrip data transmission between any two service centers, as well as the minimal amount of time required for processing of the information at the service center. Alternatively, rather than using worst case times, which can get quite large in packet switching arrangements, the system can use a maximum time out set by the designer. It is noted that this processing time may in fact be negligible and can likely be neglected entirely or extended if such networks are known to be very busy or loaded.

Presuming the bid time has not expired, the system checks, at decision point 407, whether any bids have been received. If so, the received bid is stored to block 408 and the bid counter is incremented at block 409. Next, the number of bids received is compared with the number of bidding service centers at decision point 410. If the two numbers are equal, it means that all of the service centers have submitted their bids, and the originating service center can therefore proceed to award the job. It is possible that all of the bids are received before the bid time expires because the bid time accounts for the worst case transmission delay between each bidding center and all other bidding centers, whereas the particular bids received may actually be received slightly faster than the worst case scenario allows for.

As decision point 410 shows, if the maximum number of bids has not yet been received, then the system returns to decision point 406 to check if the bid time has expired. If the bid time has not expired, then the system continues to search for bids as previously described.

Once the bid time has expired or the maximum number of bids is received, decision point 411 checks to see if any bids are stored. Unless all other service centers did not bid, one or more bids should be stored.

Figure 4B:
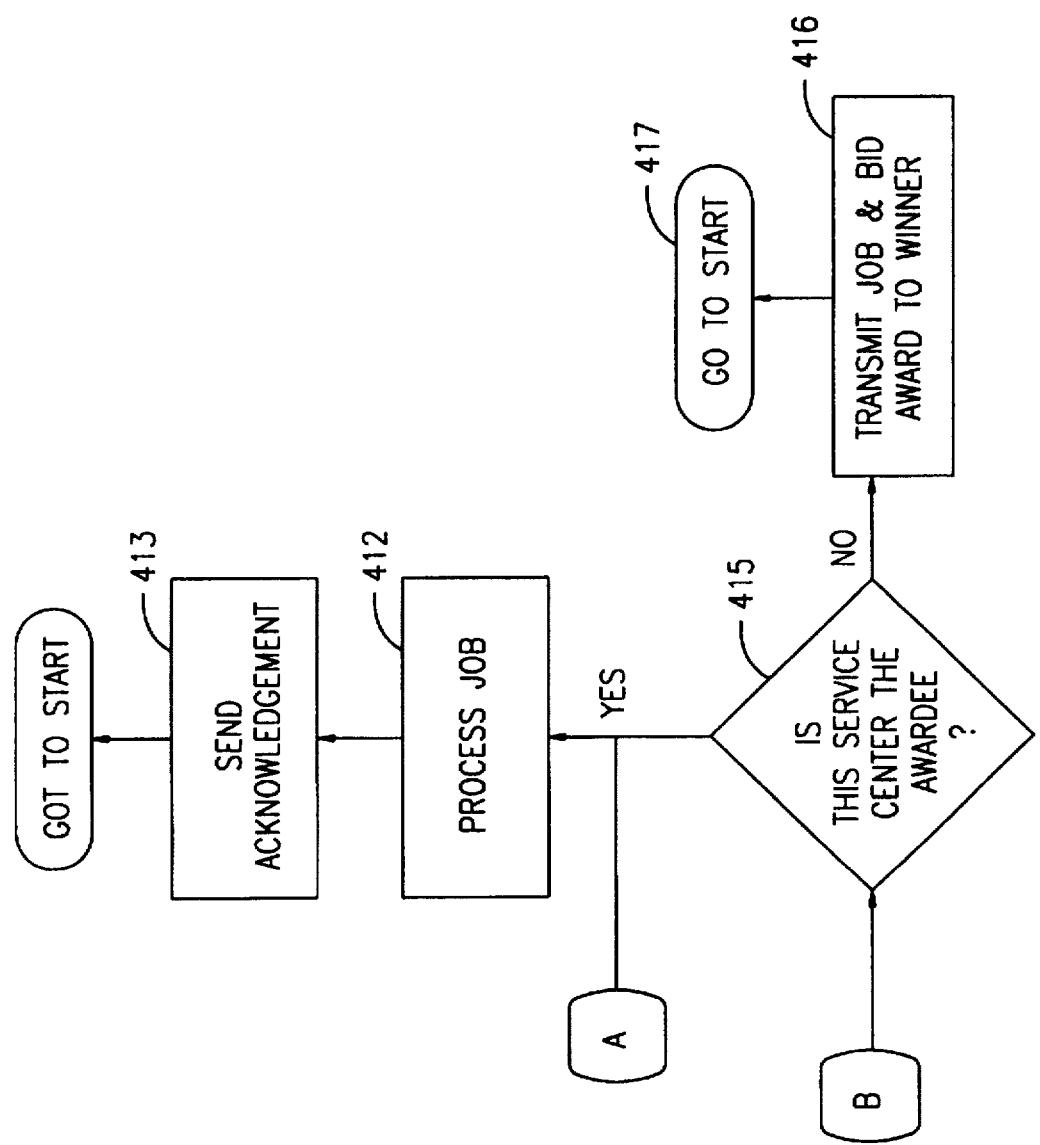
FIG. 4B is the remainder of the flow chart of FIG. 4A.

If no bids are stored, decision point 411 transfers control to block 412 of FIG. 4B, where the job is processed by the originating service center, an acknowledgment is recorded at block 413, and control is transferred back to start block 401.

Alternatively, if one or more of the bidding service centers submits a bid, which will usually be the case, the originating service center compares the bids and awards the bids to the best bidder at block 414. Control is then transferred to decision point 415 (FIG. B), which determines if the originating service center or one of the bidding centers was awarded the job. If the originating service center happens to be the lowest cost service center, then control is transferred to operational block 412 for processing, just as if no other bids had been received. Otherwise, operational block 416 transmits the information required to process the job, as well as the bid award to the lowest cost service center, and subsequently returns control to start 401 at block 417.

If the job is awarded to one of the bidding service centers, that service center may also transmit an acknowledgment to the originating service center once the job has been processed. The particular types of acknowledgments and record keeping utilized may be selected by the system designer in accordance with the particular end user and/or other system specifications.

In another optional variation of the invention, the overhead associated with all of the service centers bidding on different jobs is minimized by assembling a block of calls and transmitting a "block bid request" to all of the other service centers. The service centers, utilizing an algorithm similar to that displayed in FIG. 3, calculate their bid for each of the calls contained in the bid request. A composite bid comprising the cost of transmitting each call is sent back to the originating service center. The originating service center may then assign particular calls from the block to different ones of the particular service centers, so that each call returns the lowest possible cost.

Additionally, a similar although slightly less efficient technique is to have each service center bid the entire block, and then assign the block of calls to be serviced by the service center which can so service such calls at the lowest cost. This technique is slightly less efficient because the service center which can service the calls at the lowest possible cost may actually incur higher costs for particular calls than other service centers. However, the slight decrease in optimization comes with the benefit that less overhead is required to be incurred during the bidding process.

Another variation which involves lowering the bidding overhead takes advantage of the fact that there are certain service centers which may be known in advance to be more expensive than other service centers for particular calls. For example, while the New York service center may be unsure as to whether the New York service center itself or the Los Angeles service center will incur a lower cost of transmission to a particular end user, the New York service center may be certain that the Tokyo service center will incur a much higher cost than either the New York or Los Angeles service center. Accordingly, if a New York call is to be bid upon by various service centers, the New York service center can avoid sending the bid request to the Tokyo center and the Tokyo center can thus avoid even submitting a bid because the New York service center will be certain that the Tokyo service center will be too expensive to win the job. This technique itself can be refined by taking into account particular times of day.

While the invention has been described with respect to cost, the techniques are applicable when applied to any parameter sought to be optimized. For example, rather than optimizing costs, one may seek to maximize quality. In such a case, the bid requests and bids may be used exactly as described herein, with the exception that the bid would not be valued based upon cost but upon a unit of measure indicative of quality. Thus, for example, in a microwave communications system, the different centers, may submit bids indicating how much transmitting power output they can supply to a known destination, with the greatest output power value being awarded the job.

Resolution, power output from a transmitter, or any other criteria can be optimized by having a plurality of service centers submit bids. Each bid includes the value of a parameter to be optimized or some composite of parameters, and the "best" service center, i.e., the one that has the best value indicative of the parameter to be optimized, is selected. Additionally, a parameter may be presumed "optimized" as long as it meets certain criteria, even if other service centers can do the job for less. For example, bid is received for under one dollar, the originating service center may presume the cost is optimized and award the job, even if other service centers can do the job cheaper.

The service centers can be part of the public network, or they can alternatively be private services connected to the network and competing for business. The inventive technique can be applied to power transmission, packet switching, or any other system in which it is desirable to optimize a parameter.

In still another embodiment, rather than having the service centers send bids, the originating center can send out the "bid". In such a scenario, the bid includes the cost for which the job must be completed, and the first service center that responds with a message that it can complete the job for that cost is awarded the job.

Service centers can "subcontract" out the job by competitively bidding it among a plurality of local nodes. Such local competitive bidding can be accomplished in the same manner as described herein for the bidding process.

Another variation involves not taking bids from all of the centers, but only from a select few. For example, the bid request can include a field of information which specifies that only service centers which can perform the job for less than a predetermined cost should bid. In other words, a "ceiling" is supplied above which bids should not be sent. The ceiling could, for example, be the cost of for the originating service center to service the job. Thus, service centers only bid if they can perform the job cheaper than the originating service center.

Other variations will be apparent to those of ordinary skill in the art and all such variations are intended to be covered by the following claims.

We claim:

1. A telecommunications system for servicing requests in a manner to optimize a predetermined parameter, said telecommunications system comprising:

a plurality of service centers, each service center comprising means for servicing requests, said requests being required by an end user of said telecommunications system, the servicing of said requests having a duration;

means for determining which service center of said plurality of service centers can service each of said requests at an optimum value of a predetermined parameter said means for determining including:

means for requesting that each service center submit a bid indicative of a value of said predetermined parameter at which said service center can service each of said request;

means for calculating the bid, based upon at least in part the duration of a particular request to be serviced and a value of a predetermined parameter at which each service center can service said particular request and for comparing bids calculated by the service centers; and means for servicing each of said requests from said service center which can service each of said requests at said optimum value.

2. The system of claim 1 wherein said means for determining includes means for determining said optimum value has been achieved if a service center which can service said request for a cost which meets a predetermined criteria is located.

3. The system of claim 1 wherein said means for determining includes means for receiving, at an originating service center, bids from other service centers, said bids being calculated for each request, and for determining which of said bids is from a service center which can service said request at said optimum value.

4. The system of claim 1 wherein said means for determining includes means for transmitting, from said originating service center to other ones of said service centers, a value of said parameter at which said originating service center can service said request, and for servicing said request from any service center which can service said request for a cost equal to or better than said value.

5. The system of claim 2 wherein the bid from each service center is calculated based upon a system activity being performed at said service center.

6. The system of claim 5 further comprising means of determining profit being generated from system activities presently being performed; and means for transmitting a bid to an originating service center, which bid is at least equal to said profit being generated from said system activity presently being performed.

7. The system of claim 1 wherein said means for determining includes means for transmitting, from said originating service center to other ones of said service centers, a value of said parameter at which said originating service center can service said request; and means for transmitting bids from only other ones of said service centers which can service said request at a better value said parameter.

8. The system of claim 1 wherein said means for servicing includes means for transmitting information over multiple communications networks.

9. A system for servicing telecommunications requests while doing so at an optimum value of a predetermined parameter, said requests being initiated by an initiator, said system comprising:

a plurality of telecommunications service centers, each service center comprising means for servicing requests from any one of a plurality of the service centers each service center further comprising means for storing data to be delivered in servicing requests;

means for processing each request to determine the service center which can service the request at the optimum value of the predetermined parameter and for servicing said request from said service center said means for processing including means at each service center for assembling bids corresponding to a value of said parameter at which said telecommunications requests can be serviced; and means for servicing said request from said service center which can service said request at said optimum value, including means for delivering said stored data to said initiator of said requests.

10. The system of claim 9 wherein each of said centers includes means for determining the cost of servicing said request from other ones of said service centers.

11. A system according to claim 9 further comprising:

means for processing blocks of requests to determine the service center which can service the block at the lowest cost, and for servicing said block of requests from said service center.

12. The system according to claim 9 wherein said means for processing includes means for storing cost tables associated with at least one of said service centers.

13. The system according to claim 12 wherein each service center comprises means for receiving bids from other service centers and for comparing said bids to each other to determine which of said service centers can service said request at the optimum parameter value.

14. The system according to claim 12 wherein at least one of said service centers includes means for increasing a bid by a cost factor.

15. The system of claim 12 wherein said cost factor depends upon system activity.

16. The system of claim 9 wherein the parameter is quality and the optimum value is the highest quality.

* * * * *